UNITED STATES PATENT OFFICE.

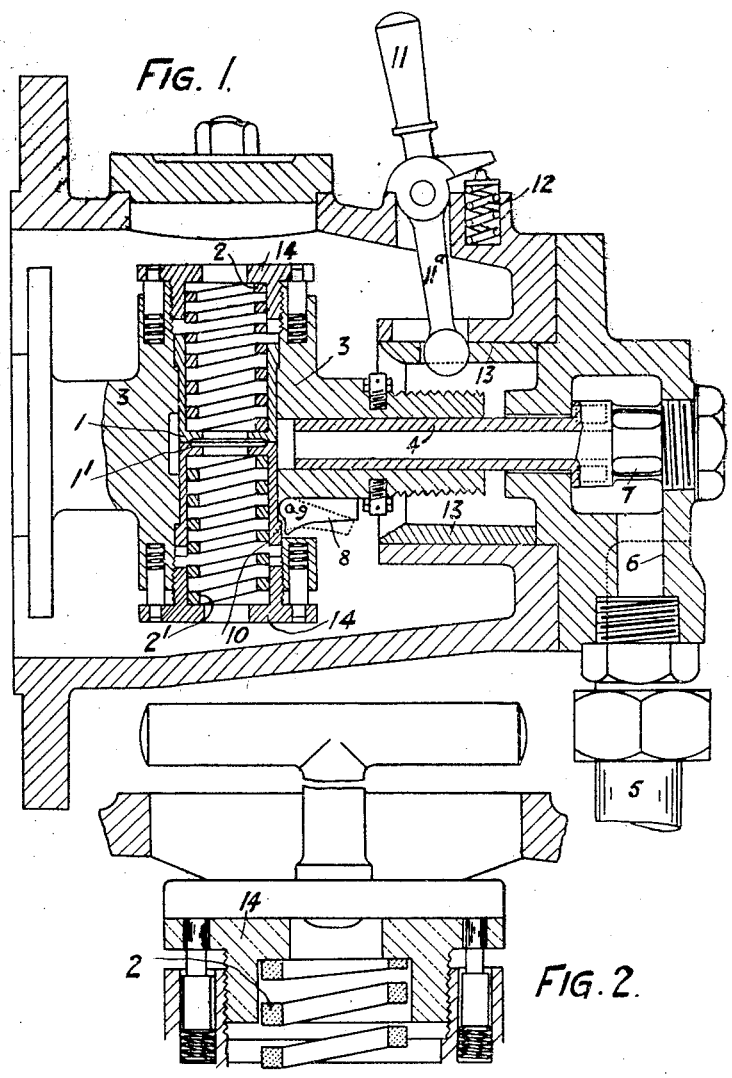

DAVID COCKBURN AND DONALD MacNICOLL, OF CARDONALD, NEAR GLASGOW, SCOTLAND.

GOVERNING AND EMERGENCY MECHANISM.

1,347,208.  Specification of Letters Patent.  Patented July 20, 1920.

Application filed January 19, 1920. Serial No. 352,535.

*To all whom it may concern:*

Be it known that we, DAVID COCKBURN and DONALD MACNICOLL, subjects of the King of the United Kingdom of Great Britain and Ireland, and residing at Cardonald, near Glasgow, Scotland, have invented a certain new and useful Improvement in Governing and Emergency Mechanism, of which the following is a specification.

This invention relates to improvements in governing and emergency mechanisms.

Mechanism according to the invention includes a valve or valves adapted to be unseated under the action of centrifugal force, such valve or valves controlling the passage of lubricant or fluid in a forced lubrication system or in any fluid pressure system failure of which or fall in pressure of which initiates the action of a governing or emergency mechanism.

In practice there are preferably employed two or more of such valves, one of which is unseated and reseated as the speed increases or decreases and the other of which may be arranged to be unseated and locked in unseated position on attainment of excessive speed.

The invention is illustrated in the accompanying drawings in which Figure 1 is a longitudinal section; Fig. 2 a sectional detail of mechanism according to the invention.

The construction shown includes two valves 1, 1' normally held in closed or seated position by springs 2, 2'. The rotor 3 is fitted over the floating sleeve 4 which communicates with the piping 5 through the passage 6 and lantern 7 whereby fluid pressure medium may flow to the valves 1, 1'.

Where the mechanism is used as a governing and emergency control gear, the two valves 1, 1', are held in closed position as shown by means of two springs 2, 2', the pressure exercised by the spring 2 being fixed to suit the governing speed and the pressure exercised by the spring 2' being such that the spring 2' is overcome at a predetermined excessive speed.

On the governing speed being reached, the valve 1 is unseated first due to the centrifugal force and allows the pressure medium to pass from the sleeve 4 and escape, thereby causing a drop of pressure in the system which in turn may be utilized to effect the throttling of the supply of steam for a steam plant or of oil for an internal combustion plant.

When the speed has dropped again to normal, the valve 1 is reseated under the action of the spring 2, the pressure in the system is again restored, and the flow of steam or oil is permitted as required in normal working conditions.

When excessive speed is reached, both valves 1, 1' are unseated. Due to the action of the centrifugal force the pawl 8 is caused to swing about the pin 9 and lock itself under the collar 10 of the valve 1', thus preventing the valve 1' from closing and thereby maintaining the plant which it is governing at a standstill.

To reseat the valve 1' the resetting lever 11 is moved over in opposition to the spring 12 causing the end 11ᵃ of the lever 11 to push the sleeve 13 over the end of the pawl 8 to effect disengagement of the pawl 8 from the valve 1', so that the valve 1' may be reseated. When the valve has been closed, the resetting lever 11 is released and is restored to initial position by the spring 12.

The adjustment of the springs 2, 2' holding the valves 1, 1', in closed position is effected by means of the adjusting screws 14 one of which is shown to a larger scale in Fig. 2.

We claim:—

1. In a governing device, the combination with a rotor, two tubular valves rotatable with said rotor, each of said valves presenting a seat to the other, both valves adapted to be lifted under the action of centrifugal force, and a fluid pressure conduit controlled by said valves.

2. In a governing device, the combination with a fluid pressure conduit, a rotor, a valve rotatable with said rotor and serving to control said conduit, said valve adapted to be unseated under the action of centrifugal force, and means for locking said valve in unseated position.

3. In a governing device, the combination with a fluid pressure conduit, a rotor, a valve rotatable with said rotor and adapted to control said conduit, said valve adapted to be unseated under the action of centrifugal force, means for locking said valve in unseated position and a resetting device for disengaging said locking device to permit the seating of said valve.

4. In a governing device, the combination with a rotor, two valves rotatable with said rotor, and both adapted to be unseated under the action of centrifugal force, a device for locking one of said valves in unseated position, and a fluid pressure conduit controlled by said valves.

In testimony whereof we have signed our names to this specification in the presence of two subscribing witnesses.

DAVID COCKBURN.
DONALD MacNICOLL.

Witnesses:
  ISABEL ROLLO,
  ISABEL RITCHIE.